United States Patent
Hodgkins et al.

(10) Patent No.: US 10,941,354 B1
(45) Date of Patent: Mar. 9, 2021

(54) **HYDROCRACKING CATALYST COMPRISING A BETA ZEOLITE (*BEA) FRAMEWORK SUBSTITUTED WITH TI AND ZR AND METHODS FOR ITS PREPARATION AND USE**

(71) Applicants: SAUDI ARABIAN OIL COMPANY, Dhahran (SA); JGC CATALYST AND CHEMICALS LTD., Kanagawa (JP)

(72) Inventors: Robert Peter Hodgkins, Dhahran (SA); Omer Refa Koseoglu, Dhahran (SA); Koji Uchida, Kanagawa (JP); Tomoyasu Kagawa, Kanagawa (JP); Mitsunori Watabe, Kanagawa (JP)

(73) Assignees: Saudi Arabian Oil Company, Dhahran (SA); JGC Catalysts and Chemicals Ltd., Kanagawa (JP)

( * ) Notice: Subject to any disclaimer, the term of this patent is extended or adjusted under 35 U.S.C. 154(b) by 0 days.

(21) Appl. No.: 16/589,719

(22) Filed: Oct. 1, 2019

(51) Int. Cl.
*C10G 47/20* (2006.01)
*C10G 47/36* (2006.01)

(52) U.S. Cl.
CPC ............. *C10G 47/20* (2013.01); *C10G 47/36* (2013.01)

(58) Field of Classification Search
None
See application file for complete search history.

(56) References Cited

U.S. PATENT DOCUMENTS

| | | | |
|---|---|---|---|
| 4,826,586 A | 5/1989 | Herbst et al. | |
| 5,905,051 A * | 5/1999 | Wu | B01J 29/40 502/101 |
| 6,017,840 A * | 1/2000 | Wu | B01J 29/7007 208/136 |
| 6,063,944 A | 5/2000 | Di Renzo et al. | |
| 9,221,036 B2 | 12/2015 | Koseoglu et al. | |
| 10,081,009 B2 | 9/2018 | Koseoglu et al. | |
| 10,293,332 B2 | 5/2019 | Koseoglu et al. | |
| 2007/0249879 A1 * | 10/2007 | Iaccino | C07C 15/02 585/418 |
| 2013/0319910 A1 | 12/2013 | Koseoglu et al. | |
| 2015/0375218 A1 | 12/2015 | Koseoglu et al. | |
| 2016/0264543 A1 * | 9/2016 | Vautravers | B01J 31/0209 |
| 2018/0258011 A1 * | 9/2018 | Salciccioli | C07C 6/06 |
| 2019/0022630 A1 | 1/2019 | Koseoglu et al. | |

FOREIGN PATENT DOCUMENTS

| | | |
|---|---|---|
| CN | 106140289 A | 11/2016 |
| CN | 106145136 A | 11/2016 |
| CN | 104549453 B | 2/2017 |
| CN | 106145136 B | 7/2018 |
| JP | 2000-334305 A | 12/2000 |
| JP | 2002-255537 A | 9/2002 |
| JP | 2003-226519 A | 8/2003 |
| WO | 2007/032232 A1 | 3/2007 |

OTHER PUBLICATIONS

Reddy et al., "A Simple Method for the Preparation of Ti Beta Zeolite Catalysts", Studies in Surface Science and Catalysts, 94:309-316 (1995) (Abstract only).
Hamdy et al., "Structual and Photocatalytic Properties of Precious Metals Modified TiO2-BEA Zeolite Composites", Mol. Catalysts, 441:140-149 (2017) (Abstract only).
Rakshe et al., "Acidity and m-Xylene Isomerization Activity of Large Pore, Zirconium-Containing Alumino-silicate with BEA Structure", Journal of Catalysis, 188:252-260 (1999) (Abstract only).
Wolf et al., "Post-synthetic Preparation of Sn-, Ti- and Zr-beta: a Facile Route to Water Tolerant, Highly Active Lewis Acidic Zeolites", Dalton Transactions, Issue 11 (2014) (Abtract only).
Gang Yang, et al. "Structure, Stability, and Lewis Acidity of Mono and Double Ti, Zr, and Sn Framework Substitutions in BEA Zeolites: A Periodic Density Functional Theory Study," Journal o Physical Chemistry C., 117:8:3976-3986 (Feb. 28, 2013).
Van Der Waal, et al, "Synthesis and chacterization of aluminum-free zeolite titanium beta using di(cyclohexylmethyl dimethylammonium as a new and selective template" Microporous and Mesoporous Materials, 25:1-3:43-57 (Dec. 9, 1998).
International Search Report from corresponding PCT Application No. PCT/US2020/052554 dated Jan. 12, 2021.

* cited by examiner

*Primary Examiner* — Tam M Nguyen
(74) *Attorney, Agent, or Firm* — Abelman, Frayne & Schwab

(57) ABSTRACT

The invention relates to methods for hydrocracking or hydrotreating hydrocarbon containing feedstocks. This is accomplished via the use of a catalyst which comprises a β zeolite of *BEA framework, where a portion of aluminum atoms in the *BEA framework have been substituted by from 0.1-5.0 wt % of each of Ti and Zr, calculated on an oxide basis.

23 Claims, 3 Drawing Sheets

HYDROCRACKING CATALYST COMPRISING A BETA ZEOLITE (*BEA) FRAMEWORK SUBSTITUTED WITH TI AND ZR AND METHODS FOR ITS PREPARATION AND USE

FIELD OF THE INVENTION

This invention relates to a method for hydrocracking a hydrocarbon feedstock, using a new catalytic composition. Specifically, the catalytic composition comprises a *BEA zeolite, where a part of the aluminum ions in the zeolite framework have been substituted with 0.1-5 mass % of both of titanium and zirconium, calculated on an oxide basis, and also comprises at least one active phase metal which has hydrogenation and/or hydrodesulfurization and/or hydrodenitrogenation functions.

BACKGROUND OF THE INVENTION

For many years, catalysts which contained zeolites, and one or both of titanium and zirconium, where the metals were carried on mesopores, were used for treating bottom oil. See, e.g., Japanese Unexamined Patent Application Publication Nos. 2000-334305, 2002-255537, and 2003-226519. Also, see U.S. Pat. Nos. 10,293,332 and 9,221,036, incorporated by reference.

Japanese Patent Application Publication No. 2000-334305 teaches hydrocracking catalysts which comprise an active phase metal on a zeolite support. The support contains ultrafine particles of titanium or zirconium oxide, which have been combined with the inner surfaces of mesopores. The atomic ratio of Al to Si is from 0.01-0.1, which equates to a $SiO_2/Al_2O_3$ molar ratio or "SAR" of 20 to 200. These catalysts are prepared by combining mesopore containing zeolites with an aqueous solution of a Ti or Zr oxide, at a pH of from 0.8 to 2. The zeolite is then washed, dried, and fired at 400-600° C.

The "255537" publication teaches a zeolite with a high mesopore content and an atomic ratio of Al to Si of from 0.01 to 0.2 (an SAR of 10 to 200), with 30-50% of the mesopore volume having a pore diameter of to 50 100 Å. The mesopores have a volume of 0.14 cc/g or more, with 25% or more of the Al atoms being tetracoordinated. Ultrafine particles of Ti or Zr oxide, which are not readily reduced, combine with the inner surface of zeolite mesopores. This serves as a support for active phase metals. The process for making the catalyst is similar to that for the "334305" application, in that the zeolite is brought into contact with an aqueous solution of Ti or Zr oxide, at a pH of 0.8 to 2, followed by drying at 50-200° C., and firing at 350-600° C.

The "226519" application also teaches a hydrocracking catalyst, where a zeolite of FAU (faujasite) structure, contains Ti, Zr, or Hf. The metal content is from 0.1-10% by weight (calculated on an elemental basis), an Al/Si atomic ratio of 0.01 to 0.1 (SAR of 20 to 200), and also contains active phase metals. The FAU zeolite has a crystal lattice constant of from 24.28-24.46 Å. The preparation is similar to that of the catalyst described supra.

In these hydrocracking catalysts, however, the mesopores become clogged with the metals which are present in the feedstock such as vanadium and nickel, and therefore these catalysts were not suited for hydrotreating (or hydrocracking) of heavy hydrocarbon oil such as VGO and DAO, or other petroleum based hydrocarbon feedstocks, without any prior protective hydrodemetallization layer As disclosed in WO2007/032232, incorporated by reference in its entirety, hydrocracking catalysts including a Y-type zeolite as a support, contain titanium atoms incorporated into a zeolite framework. (In other words, a Y-type zeolite in which a part of the aluminum atoms constituting the framework are substituted with titanium atoms) has been developed. The above zeolite can be prepared by treating a Y-type zeolite with an acidic aqueous solution containing titanium at a pH of 1.5 or less, followed by filtering, washing, and drying. Thereby, the zeolite can be made to contain titanium atoms incorporated into a zeolite framework structure without clogging the mesopores. The reference states that, when the hydrocracking catalyst including the above zeolite as a support is used to hydrocrack heavy hydrocarbon oil, yields of middle distillates are improved because heavy hydrocarbon oil is readily diffuses into the mesopores.

U.S. Pat. No. 10,081,009, the disclosure of which is incorporated by reference in its entirety, teach that USY zeolites having an FAU framework, can be treated so as to replace a portion of the aluminum in their zeolite framework, and this aluminum can be replaced with from 0.1 to 5.0 wt % of both of Ti and Zr, where the weight percent is calculated on an oxide basis. The resulting catalysts were found to be extremely useful in hydrotreating and hydrocracking feedstocks such as hydrocarbon oil. The catalysts provided high yields of middle distillates.

Also, see published U.S. Patent Application US 2015/0375218, which is incorporated by reference in its entirety as well. U.S. Published Patent Application US 2013/0319910 is also incorporated by reference. These published patent applications all employ the USY catalyst with framework substitution discussed supra.

Beta zeolites are known in the catalytic art, although not in the context of hydrotreating or hydrocracking. U.S. Pat. No. 4,826,586, e.g., teaches the possibility of using beta zeolites in fluidized catalytic cracking (FCC) processes. The conditions under which FCC processes are carried out are very unlike those used in hydrocracking/hydrotreating, and the artisan does not treat these processes as equivalent. The FCC process also does not use hydrogen, in contrast to hydrocracking/hydrotreating. Also see CN 106145136, teaching modification of beta zeolites, as well as CN 104549543 and CN 106140289. In each case, the preparation methodology makes clear that ion exchange, rather than framework substitution, is the process by which metals are included in the zeolite, resulting in a catalyst that is not equivalent to one where framework substitution takes place.

U.S. Pat. No. 6,063,944, teaches insertion of titanium into a beta zeolite, but does not mention Zr. Also, see U.S. Pat. No. 6,017,840, teaching impregnation of metals into a beta zeolite without framework substitution. Also to this point are Reddy et al., *Studies in Surface Science and Catalysts*, 94:309-316 (1995) and Hamdy, et al., *Mol. Catalysts*, 441: 140-149 (2017), and Rakshe, et al., *J. Catalysis*, 188:252-260 (1999), discussing modification with Zr, but not Ti.

It is an aim of the present invention to provide a hydrocracking or hydrotreating methodology which improves the yield of desired products, such as middle distillates. This is accomplished by replacing the USY zeolite, of U.S. Pat. No. 10,081,009, which has an FAU framework, with a beta zeolite having a *BEA framework.

DETAILED DESCRIPTION OF PREFERRED EMBODIMENTS

Figure 1:
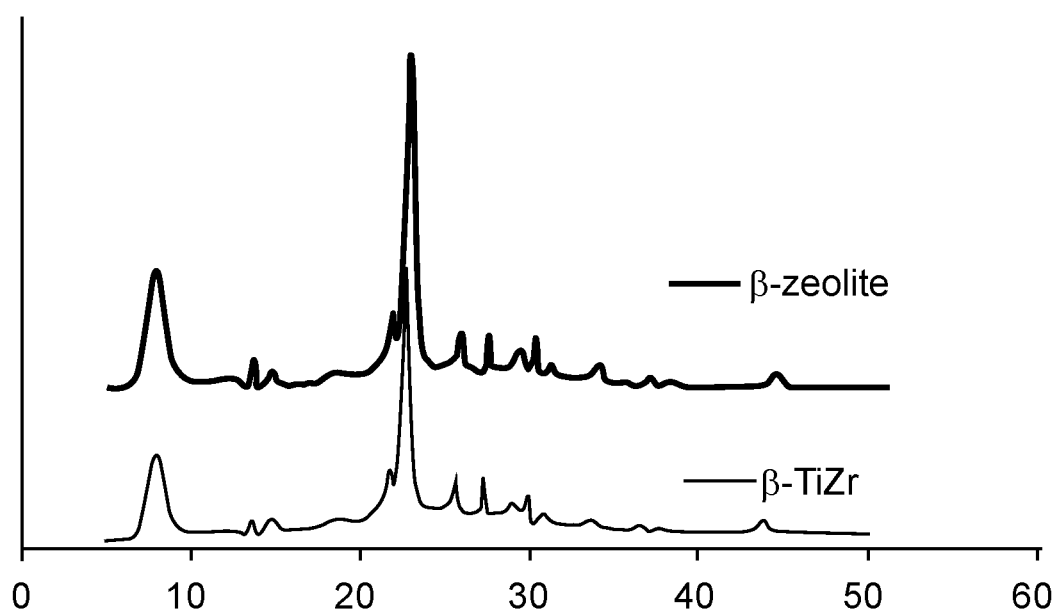
FIG. 1 presents XRD data to show structural integrity of the catalysts of the invention.

The invention is a method for hydrocracking a petroleum based, hydrocarbon feedstock under hydrocracking conditions with a catalyst, said catalyst comprising an active phase metal compound carried on a support which comprises a beta zeolite having a *BEA framework, wherein a portion of aluminum atoms in said framework have been substituted/replaced by from 0.1-5 wt/o of each of Ti and Zr, wherein the weights are calculated on an oxide basis. Optionally, 0.1-5 wt % of Hf can be used to substitute Al as well. Active phase metal comprises one or more of Fe, Co, Ni, Rh, Pd, Ag, In, Pt, Au, Cr, Mo, or W. In some embodiments, the amount of Ti and Zr is 0.1-2.0 mass % on an oxide basis. In further embodiments, the amount of Hf present is from 0.1-2.0 mass % on an oxide basis.

The modified beta zeolite framework containing Ti and Zr atoms of the invention preferably possesses one or more, and most preferably all, of the following characteristics:
(a) a crystal lattice constant of a=1.260 to 1.270 nm, b=1.260 to 1.270 nm, and c=2.6200 to 2.6500 nm;
(b) a specific surface area of 400 to 800 $m^2/g$, preferably 500-700 $m^2/g$, and
(c) a molar ratio of 10 to 200 (preferably 10-100, and more preferably, 30-70) in terms of $SiO_2$ to $Al_2O_3$.

The "specific surface area" referred to supra relates to the modified zeolite itself, as do all of the other properties listed. The zeolite containing catalyst support has a specific surface area of 15-500 $m^2/g$, and more preferably 150-450 $m^2/g$.

In the hydrocracking catalyst for hydrocarbon oil according to the present invention, a specific surface area thereof which falls preferably in a range of 15-500 $m^2/g$, preferably 150 to 400 $m^2/g$; a volume of pores having a diameter of 600 Å or less, which falls preferably in a range of 0.40 to 0.75 ml/g; and an amount of the active phase metal component in a range of 0.01 to 40% by mass, preferably from 10-35 mass % on an oxide basis. The amount of TiZr beta zeolite in the catalyst ranges from 1-80 wt % of the catalyst weight, and preferably 5-50 wt %. In some embodiments, the catalyst is on an inorganic support, preferably one which contains alumina and silica.

The method for producing the hydrocracking catalyst of the invention comprises substituting a part of aluminum atoms of the Beta zeolite with *BEA framework with zirconium atoms and titanium atoms, followed by firing the zeolite at a temperature of from 55-700° C. The Beta zeolite with *BEA framework with zirconium and titanium atoms of the invention has a crystal lattice constant falling in a range of a=1.260 to 1.270 nm, b=1.260 to 1.270 nm, and c=2.6200 to 2.6500 nm , a specific surface area of 400 to 800 $m^2/g$ and a molar ratio of $SiO_2$ to $Al_2O_3$ of 10 to 200, preferably 10-100, and more preferably 30-70, preparing a suspension having a mass ratio of 5 to 15 in terms of liquid/solid from the above fired zeolite, adding an inorganic acid or an organic acid thereto so that a pH of the above suspension is less than 2.0, subsequently adding a zirconium compound and/or a titanium compound and mixing them and then neutralizing the suspension.

In another method for producing a hydrocracking catalyst of the invention, a zeolite as described supra, is used to prepare a suspension having a mass ratio of 5 to 15 in terms of liquid/solid zeolite, adding an inorganic acid or an organic acid thereto so that the pH of the suspension is less than 2.0, adding a zirconium compound and titanium compound, mixing, and then neutralizing the mixed solution to secure the catalyst.

A third aspect of the present invention is a method for hydrocracking a petroleum based hydrocarbon feedstock, such as hydrocarbon oil with the hydrocracking catalyst described above, in the presence of hydrogen and appropriate reaction conditions.

Preferably, the method for hydrocracking a petroleum based hydrocarbon feedstock according to the invention comprise placing a reactor vessel of a hydrocracking apparatus which is a flow reactor with the catalyst of the invention, and treating the feedstock having a boiling point of 300° C. to 833° C. in the presence of hydrogen at a reactor temperature of 300° C. to 450° C., a hydrogen pressure of 4 to 30 MPa, a liquid hourly space velocity (LHSV) of 0.1 to 10 $h^{-1}$, and a hydrogen/oil ratio of 500 to 2500 $Nm^3/m^3$.

Preferably, the method for hydrocracking hydrocarbon oil according to the invention involves treating a feedstock with a boiling point of 375-650° C. with the catalyst, and in the presence of hydrogen at a reactor temperature of 330° C. to 450° C., a hydrogen pressure of 7 to 15 MPa, a liquid hourly space velocity (LHSV) of 0.2 to 1.5 $h^{-1}$, and a hydrogen/oil ratio of 1000 to 2000 $Nm^3/m^3$ to yield a middle distillate. Preferably this middle distillate is rich in kerosene and gas oil.

In the method for hydrocracking hydrocarbon oil according to the present invention, the flow reactor described above is preferably a flow reactor selected from the group consisting of a stirring bath type reactor, a boiling bed type reactor, a baffle-equipped slurry bath type reactor, a fixed bed type reactor, a rotary tube type reactor and a slurry bed type reactor.

In the method for hydrocracking a petroleum feedstock according to the invention, the hydrocarbon feedstock described above preferably contains refined oil obtained from (1) crude oil, (2) synthetic crude oil, (3) bitumen, (4) oil sand, (5) shell oil or (6) coal liquid.

In the method for hydrocracking hydrocarbon oil according to the present invention, the hydrocarbon oil described above contains refined oil obtained from crude oil, synthetic crude oil, bitumen, oil sand, shell oil or coal liquid, and the above refined oil is preferably any of a) vacuum gas oil (VGO), b) deasphalted oil (DAO) obtained from a solvent deasphalting process or demetalized oil, c) light coker gas oil or heavy coker gas oil obtained from a coker process, d) cycle oil obtained from a fluid catalytic cracking (FCC) process or e) gas oil obtained from a visbraking process.

The hydrocracking catalyst for hydrocarbon oil according to the present invention comprises a hydrogenative metal component carried on a support containing a Beta zeolite of *BEA type, which a part of aluminum atoms constituting the framework thereof is substituted with zirconium atoms and titanium ions.

Accordingly, the hydrocracking catalyst of the present invention makes it easy to diffuse heavy hydrocarbons such as VGO, DAO and the like into mesopores thereof as compared with conventional hydrocracking catalysts.

Figure 3:
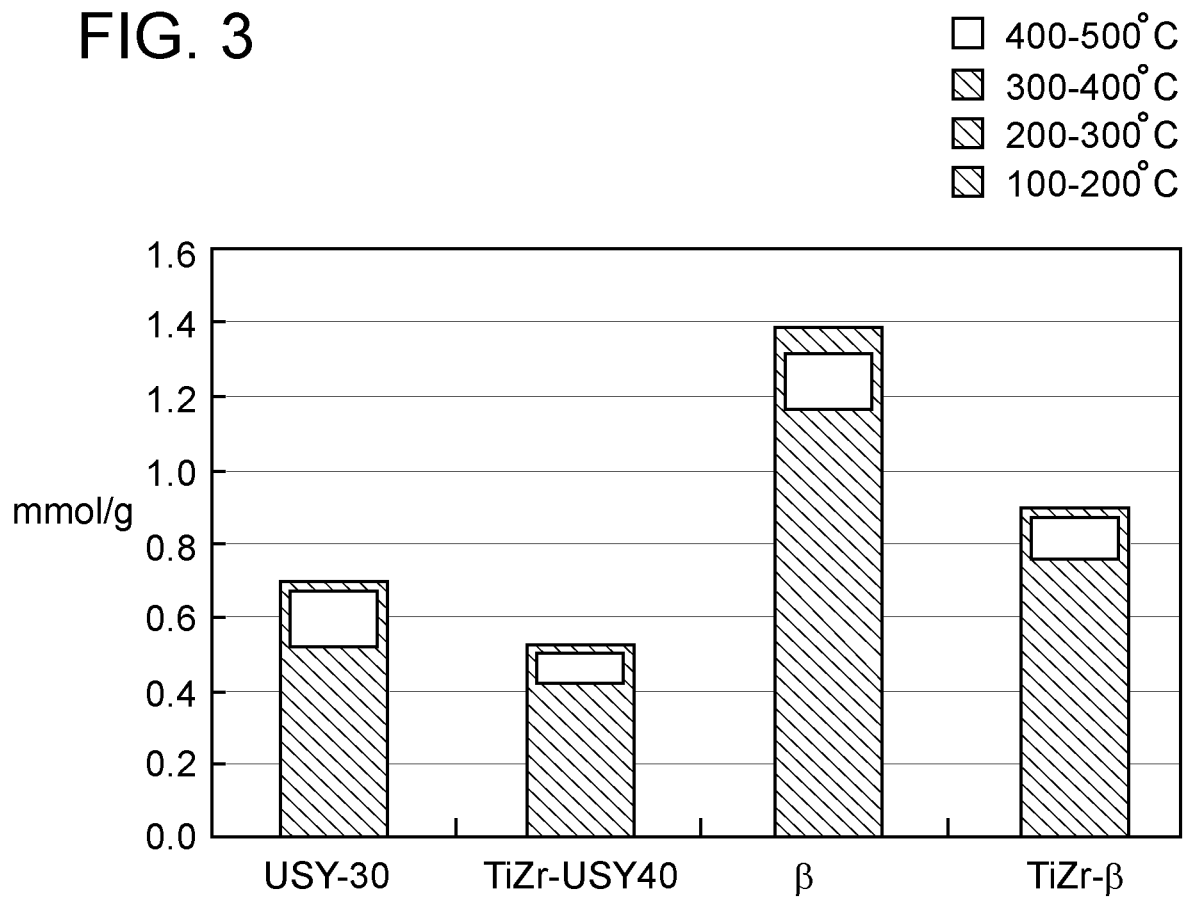
FIG. 3 shows, graphically, differences in total acidity and acidity strength between USY based catalysts, and the *BEA catalysts of the invention.

FIG. 3 shows the results of tests to determine the acidity of catalysts of the invention and the prior art.

Example 1

A beta zeolite of *BEA framework, having a silica/alumina ratio ("SAR" hereafter) of 28.5 was used. A total of 51.4 g of this zeolite was suspended in 450 g of deionized water, and heated to 40° C. A total of 14.8 g of $H_2SO_4$ (25 wt %) was added, together with 10.0 g of an aqueous solution of titanium sulfate (equivalent to 5 wt % $TiO_2$). The solution contained 8.48 g deionized water and 1.52 g titanium sulfate (equivalent to 33 wt % $TiO_2$). An additional aqueous zirconium sulfate solution (2.8 g, constituting 18 wt % $ZrO_2$) was added, and the mixture was stirred for 4 hours, then filtered and washed with 1.5 liters of deionized water. This took place at 60° C. The resulting zeolite was dried at 110° C. to yield a framework substituted, Ti/Zr beta zeolite.

The XRD data for the *BEA zeolite before framework substitution, and after, are shown in FIG. 1. It can be seen that the structural integrity of the zeolite remained.

Example 2

The *BEA zeolite and framework substituted *BEA zeolite were analyzed, and the results follow in Table 1.

TABLE 1

Compositional analysis of zeolite Beta before and after Ti/Zr treatment.

| Zeolite | $SiO_2/Al_2O_3$ ratio mol/mol | $TiO_2$ % | $ZrO_2$ % | Surface Area $m^2/g$ |
|---|---|---|---|---|
| β-Zeolite | 28.5 | — | — | 623 |
| β-Zeolite + Ti/Zr | 53.5 | 0.84 | 0.31 | 614 |

Figure 2:
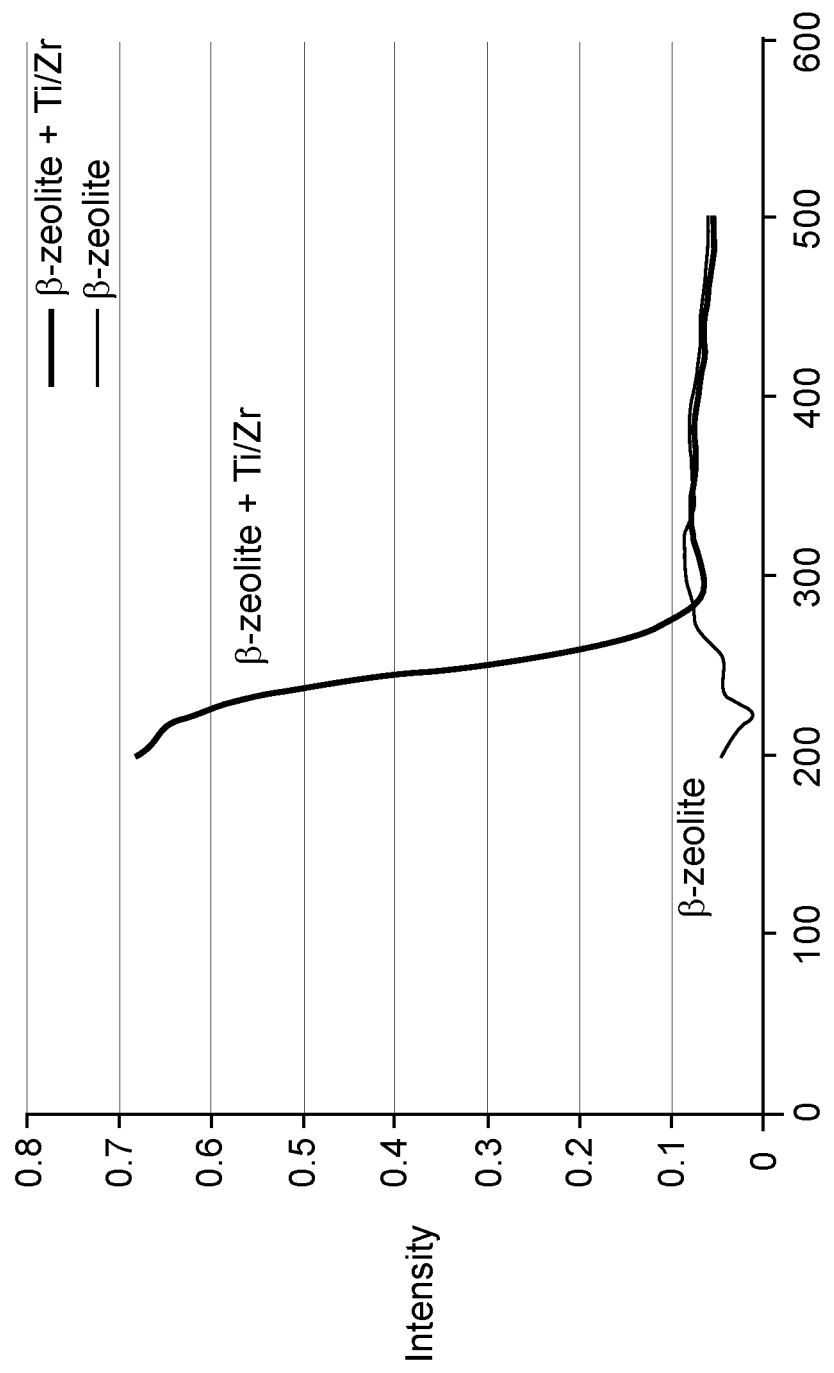
FIG. 2 depicts UV-Vis spectra for the base zeolite and the final catalyst of the invention.

Additional data are shown in FIG. 2, which presents UV-Vis spectra of the original β zeolite, and the framework substituted β zeolite. One sees a Ti 4-coordinated species and a wavelength of about 250 nm. If 6-coordinated species were present, one would expect a shift to a higher wavelength, at about 285 nm. This did not occur, as shown by FIG. 2.

Example 3

Experiments were carried out to determine what impact substitution of alumina framework by Ti and Zr would have on the acidity of the zeolite.

Both USY and *BEA zeolites were tested for acidity, unmodified, and modified by substitution of Ti & Zr.

FIG. 3 presents these results where total acidity is shown by the height of the bars, while the horizontal bars show weak (100-200° C.), medium (200-400° C.), and strong (400-500° C.) acid site content.

Other features of the invention will be clear to the skilled artisan and need not be reiterated here.

The terms and expression which have been employed are used as terms of description and not of limitation, and there is no intention in the use of such terms and expression of excluding any equivalents of the features shown and described or portions thereof, it being recognized that various modifications are possible within the scope of the invention.

What is claimed is:

1. A method for hydrocracking or hydrotreating a hydrocarbon containing feedstock, comprising contacting said feedstock with (i) a catalyst, said catalyst comprising an active phase metal and a β zeolite of *BEA framework, wherein a portion of aluminum atoms in said *BEA framework have been substituted by from 0.1 to 5.0 wt % of Ti atoms and from 0.1 to 5.0 wt % Zr atoms, said wt % being calculated on an oxide basis, and (ii) hydrogen, to hydrocrack or hydrotreat said feedstock.

2. The method of claim 1, wherein said catalyst further comprises from 0.1 to 5.0 wt % of Hf atoms calculated in an oxide basis.

3. The method of claim 1, wherein said catalyst wherein said β zeolite has the following characteristics:
(a) a crystal lattice constant of a=1.260 to 1.270 nm, b=1.260 to 1.270 nm, and c=2.6200 to 2.6500 nm,
(b) a specific surface area of 400 to 800 $m^2/g$, and
(c) a molar ratio of $SiO_2$ to $Al_2O_3$ of 10 to 200.

4. The method of claim 1, wherein said zeolite containing catalyst support has a specific surface area of 15 to 500 $m^2/g$; a volume of pores having a diameter of 600 A or in the range of 0.40 to 0.75 ml/g; and an amount of an active phase metal component ranging from 0.01 to 40 mass %.

5. The method of claim 1, further comprising:
filling a reactor vessel which is a flow reactor with the hydrocracking catalyst; and
treating a feedstock having a boiling point of 300° C. to 833° C. in the presence of hydrogen at a reactor temperature of 300° C. to 450° C., a hydrogen pressure of 4 to 30 MPa, a liquid hourly space velocity (LHSV) of 0.1 to 10 $h^{-1}$, and a hydrogen/oil ratio of 500 to 2500 $Nm^3/m^3$.

6. The method of claim 5, wherein the flow reactor is a flow reactor selected from the group consisting of a stirred tank, an ebullient bed reactor, a baffled slurry tank, a fixed bed reactor, a rotating tubular reactor and a slurry-bed reactor.

7. The method of claim 5, wherein the hydrocarbon oil comprises refined oil obtained from (1) crude oil, (2) synthetic crude oil, (3) bitumen, (4) oil sand, (5) shale oil or (6) coal oil.

8. The method of claim 5, wherein the hydrocarbon oil comprises refined oil obtained from crude oil, synthetic crude oil, bitumen, oil sand, shale oil or coal oil, and said refined oil is a) vacuum gas oil (VGO), b) deasphalted oil (DAO) obtained from a solvent deasphalting process or demetallized oil, c) light coker gas oil or heavy coker gas oil obtained from a coker process, d) cycle oil obtained from a fluid catalytic cracking (FCC) process or e) gas oil obtained from a visbraking process.

9. The method of claim 1, further comprising: filling a hydrotreating apparatus which is a flow reactor with the hydrocracking catalyst; and treating a feedstock having a boiling point of 375° C. to 650° C. in the presence of hydrogen at a reactor temperature of 330° C. to 450° C., a hydrogen pressure of 7 to 15 MPa, a liquid hourly space velocity (LHSV) of 0.2 to 1.5 $h^{-1}$, and a hydrogen/oil ratio of 1000 to 2000 $Nm^3/m^3$ to yield a middle distillate.

10. The method of claim 1, wherein said β zeolite contains from 0.1-2.0 mass % of each of Ti and Zr, on an oxide basis.

11. The method of claim 2, wherein said β zeolite contains from 0.1-2.0 mass % Hf, on an oxide basis.

12. The method of claim 1, wherein said catalyst is on an inorganic support.

13. The method of claim 12, wherein said inorganic support comprises at least one of alumina and silica.

14. The method of claim 1, wherein said β zeolite has a molar ratio of $SiO_2$ to $Al_2O_3$ of 10 to 100.

15. The method of claim 14, wherein said molar ratio is 30 to 70.

16. The method of claim 3, wherein said surface area is 500-700 $m^2/g$.

17. The method of claim 12, wherein said catalyst has a specific surface area of 150-500 $m^2/g$.

18. The method of claim 17, wherein said specific surface area is 150-450 $m^2/g$.

19. The method of claim 1, wherein said active metal phase component comprises from 0.01-40 mass % of said catalyst calculated on an oxide basis.

20. The method of claim 19, wherein said active metal phase comprises 10-35 mass % of said catalyst, calculated on an oxide basis.

21. The method of claim 1, wherein said active metal phase metals comprises Fe, Co, Ni, Rh, Pd, Ag, In, Pt, Au, Cr, Mo, or W.

22. The method of claim 1, wherein said β zeolite comprises from 1-80 mass % of said catalyst.

23. The method of claim 22, wherein said zeolite comprises from 5-50 mass % of said catalyst.

\* \* \* \* \*